(12) United States Patent
Bruno (10) Patent No.: US 9,657,648 B2
(45) Date of Patent: May 23, 2017

(54) ENVIRONMENTAL AIR CONDITIONING SYSTEM

(71) Applicant: Hamilton Sundstrand Corporation, Windsor Locks, CT (US)

(72) Inventor: Louis J. Bruno, Ellington, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 205 days.

(21) Appl. No.: 14/553,335

(22) Filed: Nov. 25, 2014

(65) Prior Publication Data

US 2016/0146114 A1 May 26, 2016

(51) Int. Cl.
 *F02C 9/18* (2006.01)
 *F02C 3/04* (2006.01)
 *B64D 13/06* (2006.01)

(52) U.S. Cl.
 CPC ............ *F02C 9/18* (2013.01); *B64D 13/06* (2013.01); *F02C 3/04* (2013.01); *B64D 2013/0611* (2013.01); *B64D 2013/0618* (2013.01); *B64D 2013/0648* (2013.01); *B64D 2013/0688* (2013.01); *Y02T 50/56* (2013.01)

(58) Field of Classification Search
 CPC ... F02C 9/18; F02C 3/04; B64D 13/06; B64D 2013/0688; B64D 2013/0618; B64D 2013/0648; B64D 2013/0611
 USPC .................................................. 417/53, 406
 See application file for complete search history.

(56) References Cited

U.S. PATENT DOCUMENTS

| 3,080,728 | A | * | 3/1963 | Groves | B64D 13/06 62/133 |
| 4,347,714 | A | * | 9/1982 | Kinsell | F02C 6/00 62/402 |
| 4,374,469 | A | * | 2/1983 | Rannenberg | B64D 13/06 62/172 |
| 4,550,573 | A | * | 11/1985 | Rannenberg | B64D 13/06 62/172 |
| 4,834,622 | A | * | 5/1989 | Schuh | F02C 3/085 415/27 |
| 5,086,622 | A | * | 2/1992 | Warner | B64D 13/06 62/172 |
| 5,086,625 | A |   | 2/1992 | Momose et al. | |

(Continued)

FOREIGN PATENT DOCUMENTS

| EP | 1327582 A1 | 7/2003 |
| EP | 1464575 A1 | 10/2004 |

(Continued)

OTHER PUBLICATIONS

Search Report regarding related EP App. No. 15 19 6055.6; dated Apr. 6, 2016.

*Primary Examiner* — Mohammad M Ali
(74) *Attorney, Agent, or Firm* — Cantor Colburn LLP (57) ABSTRACT

An environmental air conditioning system is described for conditioning compressed air for supply as conditioned air. The system includes an airflow path to which the compressed air for ultimate distribution as conditioned air (i.e., airflow path compressed air) is supplied. Then airflow path has various components of an air cycle system, and also includes a power turbine outside of the air cycle that receives compressed air and discharges it as exhaust. The power turbine transfers power to a compressor in the air cycle system.

18 Claims, 5 Drawing Sheets

(56) References Cited

U.S. PATENT DOCUMENTS

| | | | | |
|---|---|---|---|---|
| 5,113,669 | A | * | 5/1992 | Coffinberry ............ F02C 1/105 62/401 |
| 5,133,194 | A | * | 7/1992 | Army, Jr. ............... B64D 13/00 415/117 |
| 5,373,707 | A | * | 12/1994 | Ostersetzer ............ B64D 13/06 62/401 |
| 5,442,905 | A | | 8/1995 | Claeys et al. |
| 6,116,027 | A | * | 9/2000 | Smith ....................... F02C 6/10 60/648 |
| 8,051,654 | B2 | * | 11/2011 | Kirzhner ............... F01K 23/101 60/39.15 |
| 2004/0014419 | A1 | | 1/2004 | Lents |
| 2007/0266695 | A1 | | 11/2007 | Lui et al. |
| 2009/0193812 | A1 | * | 8/2009 | Kirzhner ............... F01K 23/101 60/783 |
| 2012/0174577 | A1 | * | 7/2012 | Bauer .................... F02B 37/14 60/600 |

FOREIGN PATENT DOCUMENTS

| | | |
|---|---|---|
| EP | 2527252 A2 | 11/2012 |
| WO | 9100483 A1 | 1/1991 |
| WO | 0216743 | 2/2002 |

\* cited by examiner

ENVIRONMENTAL AIR CONDITIONING SYSTEM

BACKGROUND OF THE INVENTION

This invention relates to environmental air conditioning systems (ECS), and more specifically to air cycle environmental air conditioning systems such as used on aircraft.

Aircraft that fly at altitudes above that at which ambient air is suitable for the health and comfort of crew and passengers are often equipped with air cycle environmental air conditioning systems. Such system provide pressurized conditioned air or for cooling passengers, crew, and other aircraft systems and components. These air conditioning systems typically use high pressure air bleed from a turbine engine or auxiliary power unit (APU). In some cases high pressure air may be provided by an electrically-powered compressor. The high pressure compressed air fed into these systems typically is at a temperature and pressure far in excess of the temperature and pressure required for conditioned air to be supplied to the cockpit and passenger cabin, so it must be expanded and cooled by the air conditioning system before it can be discharged into the aircraft cabin as conditioned air.

Air cycle environment air conditioning systems can operate by extracting work (i.e., mechanical energy) from turbines that expand and cool the high pressure compressed air. This work may be used to power components of the air conditioning systems such as compressors or fans. However, the typical system design has limited efficiency because it requires a source of high pressure compressed air that is 15-20 psia (pounds per square inch, absolute) (103-138 kPa) over the needed air pressure needed to pressurize the cabin with conditioned air (Approximately, 14.7 psia (101 kPa)). Bleeding high pressure compressed air from aircraft engines adversely impacts aircraft fuel efficiency during flight. Therefore, it would be desirable to operate an ECS system without the need for high pressure compressed air. Additionally, ECS systems are sized to operate at the lowest expected available engine bleed pressure (i.e., the highest altitude at which the aircraft is expected to fly), resulting in wasted energy during portions of the flight profile.

BRIEF DESCRIPTION OF THE INVENTION

According to an aspect of the invention, an environmental air conditioning system is described for conditioning compressed air for supply as conditioned air. The system includes an airflow path to which the compressed air for ultimate distribution as conditioned air (i.e., airflow path compressed air) is supplied. The airflow path has various components in fluid communication, including a compressor that receives the airflow path compressed air, a first heat exchanger that receives and cools air from the compressor, a first turbine that receives air from the first exchanger and discharges it as conditioned air. The system also includes a second turbine that receives compressed air and discharges it as exhaust. The compressed air supplied to the second turbine can be from the same source as the airflow path compressed air or it can be from a different source. A power transfer path is also included that transfers power output from the first turbine and power output from the second turbine to the compressor.

In another aspect of the invention, a method of conditioning airflow path compressed air for supply as conditioned air comprises first further compressing the compressed air in a compressor. The further compressed air from the compressor is then cooled in a first heat exchanger. The compressed cooled air from the first heat exchanger is expanded and cooled in a first turbine, and discharged as conditioned air. Compressed air from a compressed air source, which can be the same as or different than source of the airflow path compressed air, is introduced to a second turbine, and work is extracted from the compressed air, which is then discharged as exhaust. Power produced by the second turbine, and also power produced by the first turbine, is transferred to the compressor.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying figures, in which:

DETAILED DESCRIPTION OF THE INVENTION

Figure 1:
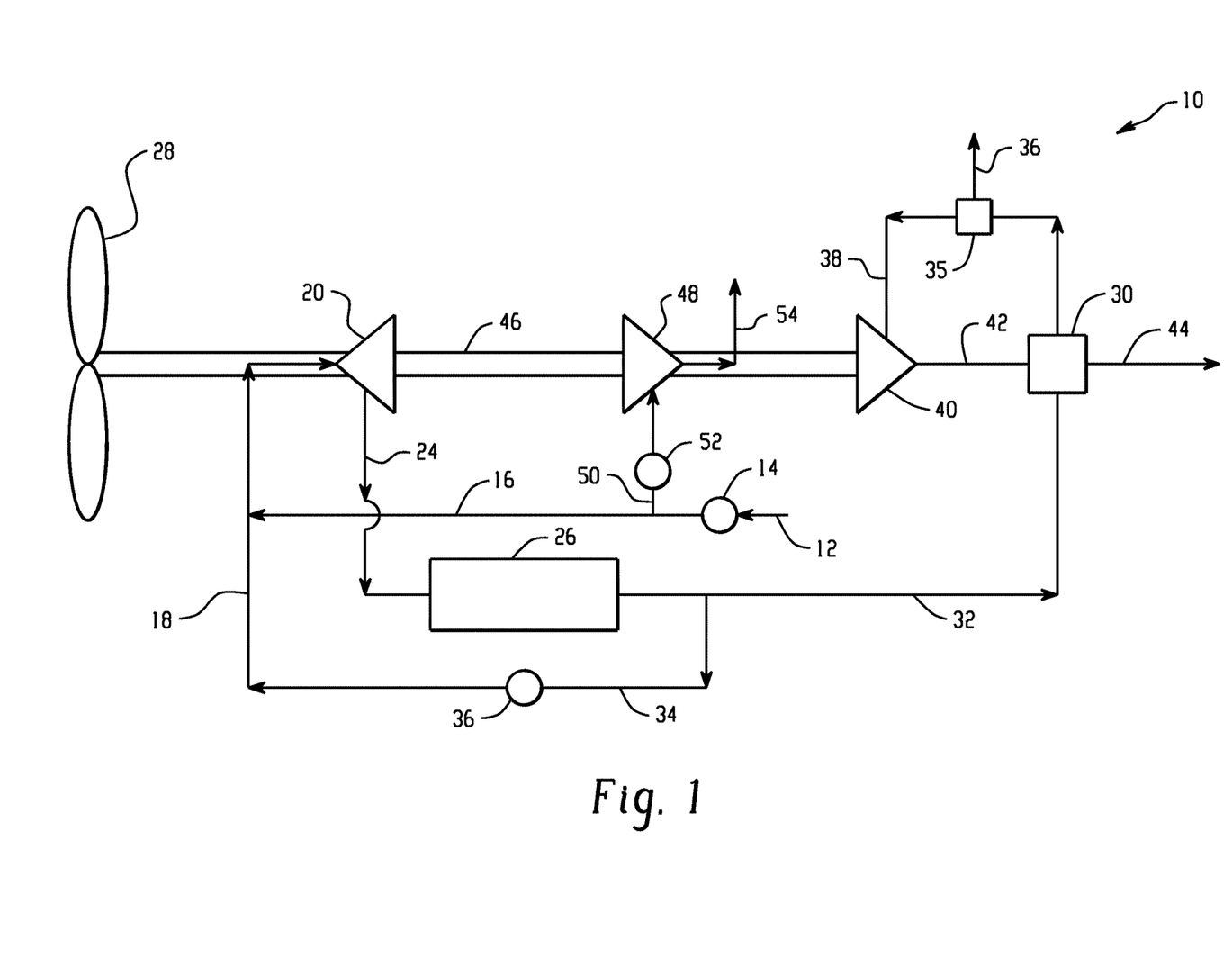
FIG. 1 is a schematic depiction of an exemplary system as further described herein.

With reference to the Figures, FIG. 1 schematically depicts an exemplary environmental air conditioning system 10 of the invention for an aircraft. As shown in FIG. 1, compressed air 12 from a compressed air source (not shown) such as a turbine engine bleed, an APU bleed, or an electrically-powered compressor is delivered through control valve 14 and conduits 16 and 18 to compressor 20. In some embodiments, compressed air 12 has a pressure of less than or equal to 20 psia (138 kPa). It should be understood that compressed air 12 may be in a range of 8 to 15 psia, more preferably in the rage of 10-12 psia. Compressor 20 further compresses and heats the compressed air 12 along with recycle air stream 34, which also results in heating of the air. The further compressed air is discharged from compressor 20 through conduit 24 to heat exchanger 26 where it rejects heat to ambient air (not shown) flowing through or across a heat absorption side of heat exchanger 26. The ambient air flowing through or across the heat absorption side of heat exchanger 26 can be a ram air flow from a forward-facing surface of the aircraft. In conditions under which insufficient airflow is generated by the forward motion of the aircraft for operation of the heat exchanger 26, the air flow can be assisted by operation of fan 28. Cooled air discharged from heat exchanger 26 is delivered through conduit 32 to a heat rejection side of heat exchanger 30. A portion of the cooled air discharged from heat exchanger 26 is also recycled as recycle stream 34 through control valve 36 to conduit 18 where it is mixed with compressed air 12 for delivery to compressor 20. In the heat rejection side of heat exchanger 30, the air is further cooled to a temperature at or below the dew point of the air and flows into water removal unit 35 where liquid water 36 condensed from the air is removed. The dehumidified air flows through conduit 38 to turbine 40, where work is extracted as the air is expanded and cooled by turbine 40. The cooled expanded air discharged from the turbine 40 is delivered through conduit 42 to a heat absorption side of heat exchanger 30 where it is used to provide the cooling needed to condense water vapor from air on the heat rejection side of heat exchanger 30. Turbine 40 can have a fixed area discharge nozzle or a variable area discharge nozzle as is known in the art. The cooled expanded air discharged from the turbine 40 is thus reheated, and heat exchanger 30 is also sometimes referred to as a condenser/reheater, and can be integrated with water removal unit 35 in a single unit. The reheated air exiting from the heat absorption side of heat exchanger 30 is then discharged from the system 10 as conditioned air 44.

Environment air conditioning system 10 also includes a power transfer path 46 such as a rotating shaft that powers the compressor 20 and fan 28. Power for the compressor 20 and fan 28 is transferred through the power transfer path 46 from the turbine 40 and also from another turbine 48. Unlike many prior art systems that power ECS power-consuming components only from energy extracted from airflow path air destined for delivery as conditioned air, turbine 48 extracts work from compressed air 12 that is diverted through conduit 50 and control valve 52 before it enters the airflow path through conduit 18 to compressor 20. Air is discharged from turbine 48 as exhaust 54.

Figure 2:
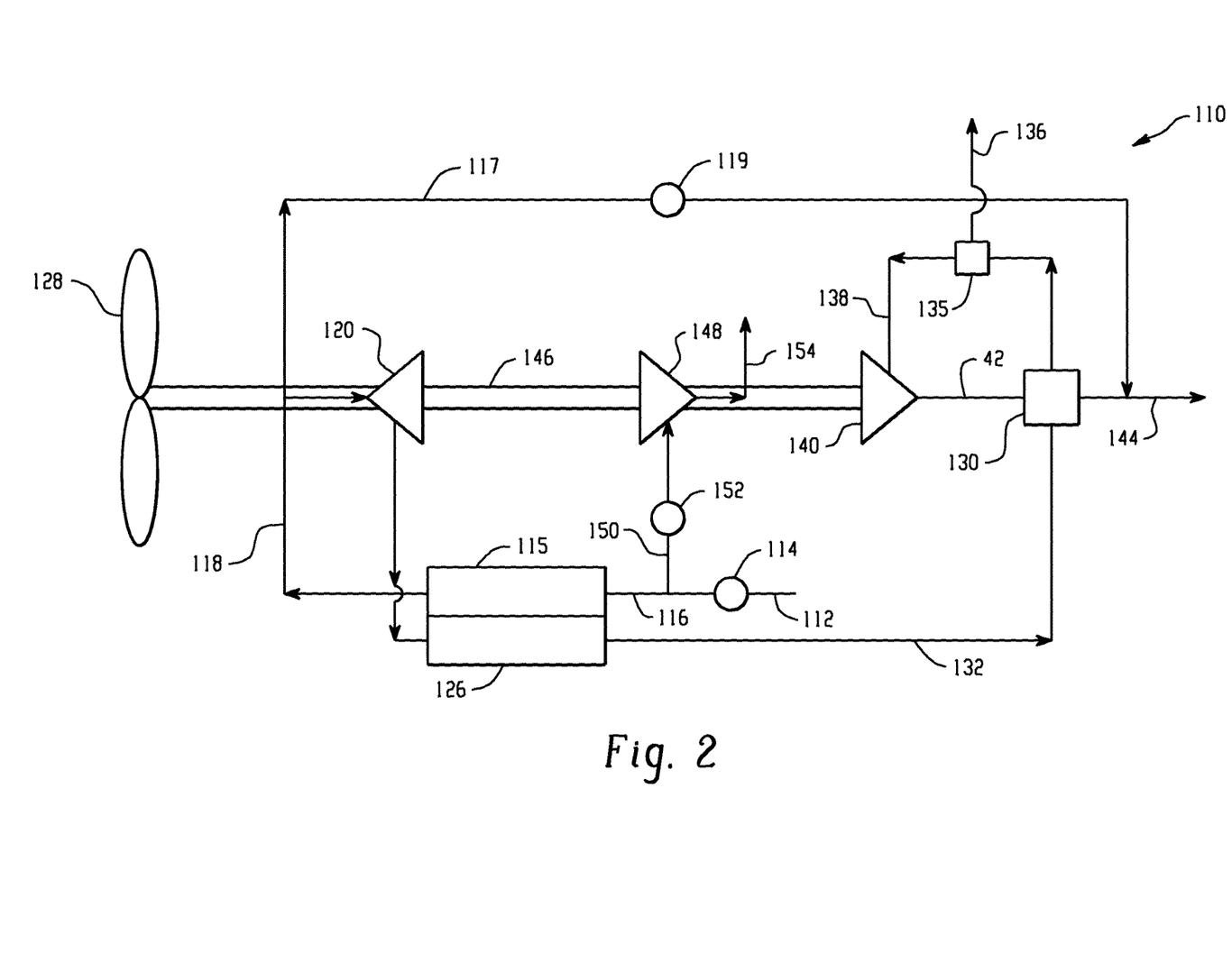
FIG. 2 is a schematic depiction of another exemplary system as further described herein.

FIG. 2 depicts an alternate exemplary embodiment of an environmental air conditioning system 110 that includes an additional heat exchanger 115. As shown in FIG. 2, compressed air 112 from a compressed air source (not shown) such as a turbine engine bleed, an APU bleed, or an electrically-powered compressor is delivered through control valve 114 and conduits 116 to heat exchanger 115 where it rejects heat to ambient air. In some embodiments, compressed air 112 has a pressure of less than or equal to 20 psia (138 kPa). It should be understood that compressed air 12 may be in a range of 8 to 15 psia, more preferably in the rage of 10-12 psia. Cooled compressed air is discharged from heat exchanger 115 to compressor 120. A portion of the air discharged from heat exchanger 115 is controllably diverted through conduit 117 and control/expansion valve 119 to mix with and control the temperature of conditioned air 144. Compressor 120 compresses and heats the air, which also results in heating of the air. The further compressed air is discharged from compressor 120 through conduit 124 to heat exchanger 126 where it rejects heat to ambient air (not shown) flowing through or across a heat absorption side of heat exchanger 126. The ambient air flowing through or across the heat absorption sides of heat exchangers 115 and 126 can be a ram air flow from a forward-facing surface of the aircraft. In conditions under which insufficient airflow is generated by the forward motion of the aircraft for operation of the heat exchangers 115, 126, the air flow can be assisted by operation of fan 128. Heat exchangers 115, 126 can share a flow path for the ambient cooling air, and can be integrated into a single unit with heat exchanger 115 sometimes referred to as a primary heat exchanger and heat exchanger 126 sometimes referred to as a secondary heat exchanger. Cooled air discharged from heat exchanger 126 is delivered through conduit 132 to a heat rejection side of heat exchanger 130. Turbine 140 can have a fixed area discharge nozzle or a variable area discharge nozzle as is known in the art. In the heat rejection side of heat exchanger 130, the air is further cooled to a temperature at or below the dew point of the air and flows into water removal unit 135 where liquid water 136 condensed from the air is removed. The dehumidified air flows through conduit 138 to turbine 140, where work is extracted as the air is expanded and cooled by turbine 140. The cooled expanded air discharged from the turbine 140 is delivered through conduit 142 to a heat absorption side of heat exchanger 130 where it is used to provide the cooling needed to condense water vapor from air on the heat rejection side of heat exchanger 130. The cooled expanded air discharged from the turbine 140 is thus reheated, and heat exchanger 130 is also sometimes referred to as a condenser/reheater, and can be integrated with water removal unit 135 in a single unit. The reheated air exiting from the heat absorption side of heat exchanger 130 is then discharged from the system 110 as conditioned air 144 to provide conditioned air to a cooling load, for example, the cabin of the aircraft.

Environment air conditioning system 110 also includes a power transfer path 146 such as a rotating shaft that powers the compressor 120 and fan 128. Power for the compressor 120 and fan 128 is transferred through the power transfer path 146 from the turbine 140 and also from another turbine 148. Unlike many prior art systems that power ECS power-consuming components only from energy extracted from airflow path air destined for delivery as conditioned air, turbine 148 extracts work from compressed air 12 that is diverted through conduit 150 and control valve 152 before it enters the airflow path at heat exchanger 115. Air is discharged from turbine 48 as exhaust 154. Exhaust 154 may be discharged to the ambient air, or the ram air. Exhaust 154 is not mixed with air from the airflow path and provided to a cooling load as conditioned air 144.

Figure 3:
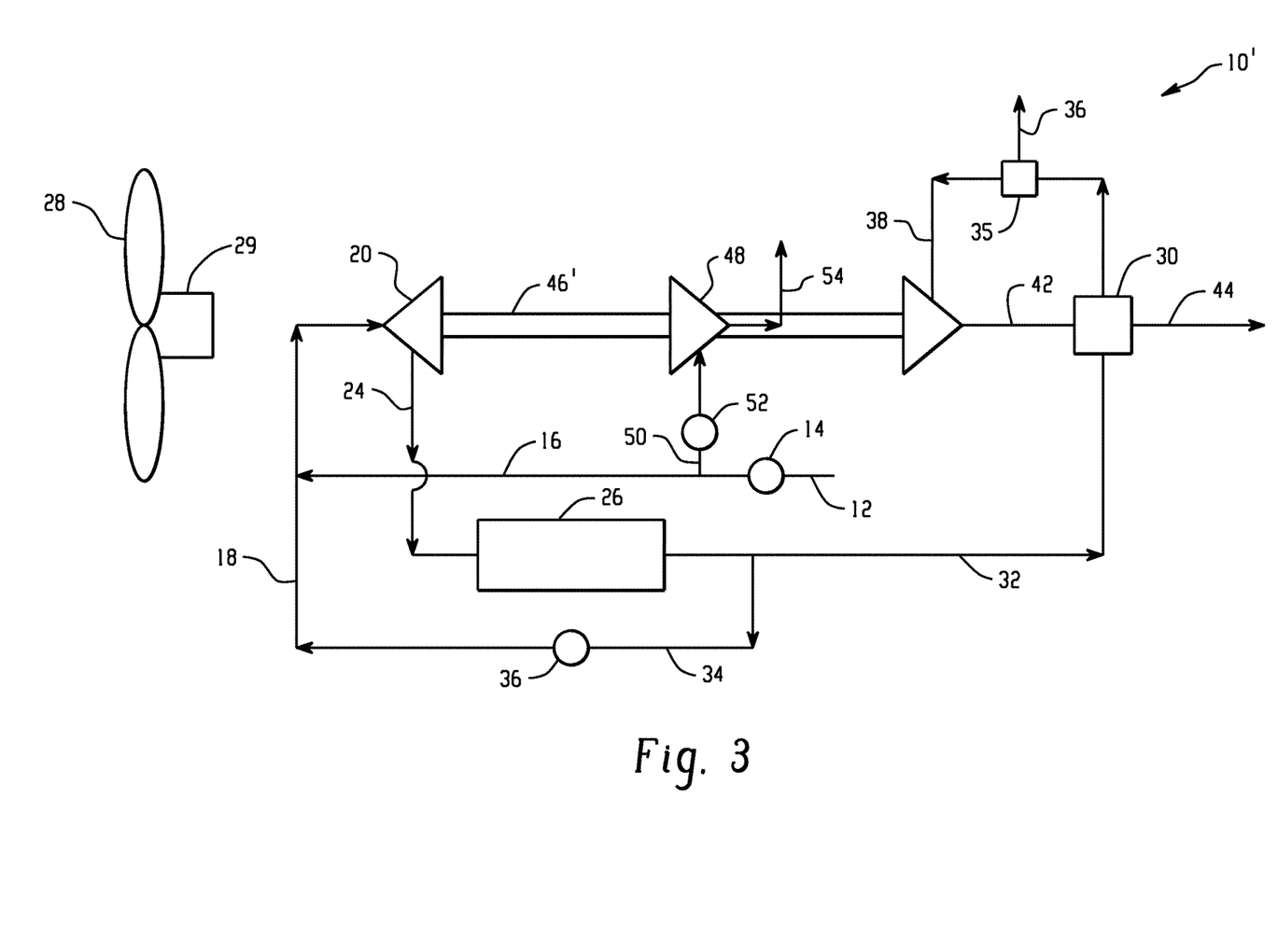
FIG. 3 is a schematic depiction of another exemplary system as further described herein.
Figure 4:
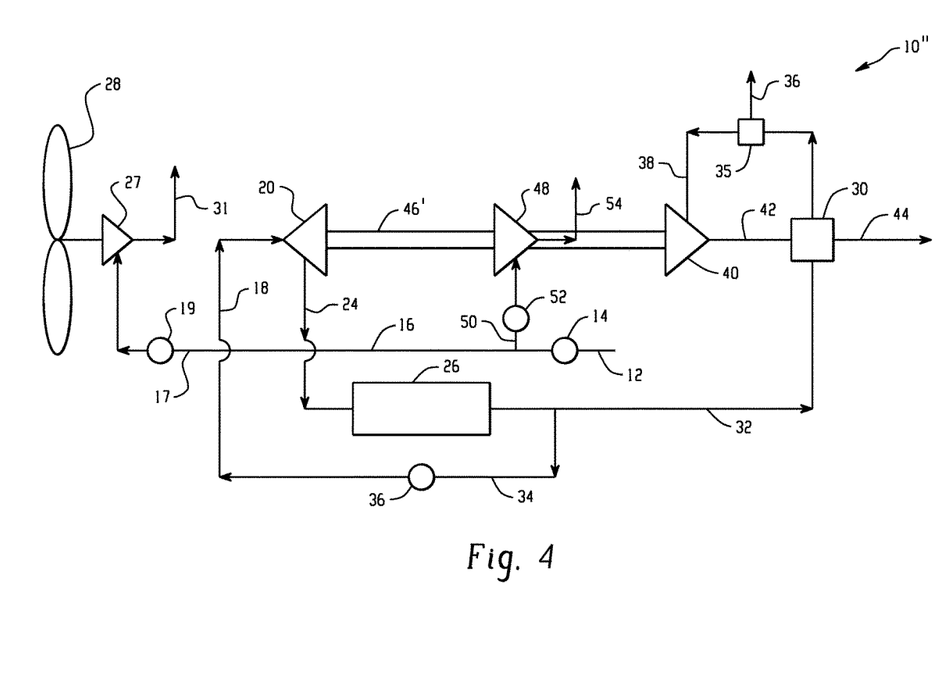
FIG. 4 is a schematic depiction of another exemplary system as further described herein.
Figure 5:
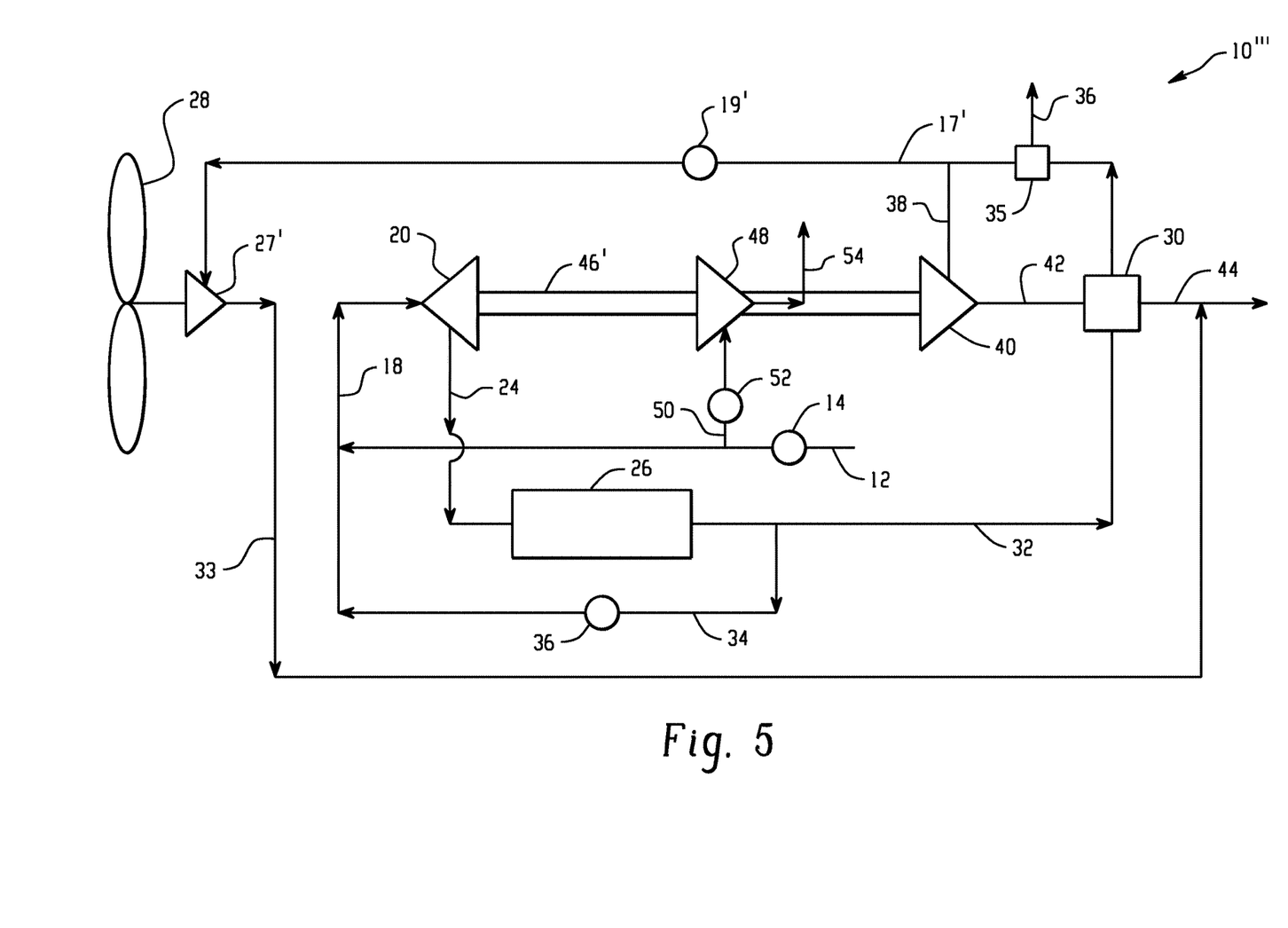
FIG. 5 is a schematic depiction of another exemplary system as further described herein.

As mentioned above, in some embodiments, the compressed air supplied to the ECS has a pressure of less than or equal to 20 psia (138 kPa). In such cases, it can be important to provide adequate power to the ECS compressor, and connection of the ECS fan to the ECS turbine-powered power transfer path can constitute a power drain even when the fan is disengaged. Accordingly, FIGS. 3-5 depict alternate exemplary embodiments where the ECS fan is not connected to the same power transfer path as the ECS compressor. The system 10' depicted in FIG. 3 use the same component numbering as FIG. 1 except as noted below. In each of FIGS. 3-5, the power transfer path 46' does not extend to the fan 28. In FIG. 3, fan 28 is instead powered by an electric motor 29 that receives electricity from an on-board source of electric power such as an APU (not shown). In FIG. 4, the fan of system 10" is powered by a turbine 27 that extracts work from a portion of the compressed air 12 that is controllably diverted through conduit 17 and control valve 19 before it enters the airflow path through conduit 18 to compressor 20. Air is discharged from turbine 27 to exhaust 31. In FIG. 5, the fan of system 10''' is powered by a turbine 27' that extracts work from a portion of the dehumidified that is controllably diverted through conduit 17' and control valve 19' from air that exits the heat rejection side of heat exchanger 30. Air discharged from turbine 27' is routed through conduit 33 and mixed with conditioned air 44.

In operation, the system can be configured to operate the second turbine (e.g., turbine 48, 148, also referred to below as a power turbine) under conditions when the first turbine (e.g., turbine 40, 140, also referred to below as a cooling turbine) does not provide sufficient power for the compressor to enable the system to deliver conditioned air at specified parameters. That is to say that the system has at least two modes of operation, a first mode where the second turbine or power turbine increases the energy being put into the compressor power transfer path, and a second mode, or standby mode, where the power turbine does not increase the energy being put into the compressor power transfer path.

Because properties of the atmosphere vary with the weather; the pressure and temperature can vary over a significant range. This variation impacts the performance of the ECS. To enable systems on an aircraft to be calibrated to these variations in the atmosphere a definition of a "standard day" has been adopted by the ICAO and the air worthiness authorities. The second turbine may be used to provide additional power to the ECS during certain portions of the flight envelope and when the atmospheric conditions deviate from the defined "standard day." In some atmospheric and flight conditions, the power turbine can be maintained in a standby mode to minimize its power drain on the power transfer path (46, 46'). In some exemplary embodiments, the power turbine can be maintained in standby mode when: (i) the aircraft is on the ground because the pressure of ambient air is relatively high or (ii) at cruise altitudes under standard day atmospheric conditions because the ECS system is optimized for this flight condition, or (iii) in climb or descent modes because the input bleed air is received at higher pressures during these flight conditions. However, at cruise altitudes on days that deviate from the standard day, the power turbine can be engaged, particularly on hot days or very low atmospheric pressure systems. Often the power turbine can be left in standby mode when the temperature is colder than a standard day, or the pressure is particularly high. In some embodiments, the power turbine can be configured to operate at outside ambient conditions that vary from the "standard day" and to maintain the second turbine in a stand-by mode during "standard day".

On many multi-engine aircraft, the ECS system is configured with redundant parallel compressed air paths into what are called ECS packs, each of the redundant ECS packs can be configured as described in the various embodiments disclosed herein. On these multi-pack ECS system configurations, to meet the cooling demands for conditions that vary from the "standard day," the redundant ECS packs can be operated in different modes. That is to say that one such pack can be operated in the first mode where the power turbine is used to increase energy input into the compressor power transfer path, while the other one or more ECS packs are operated in the standby mode minimizing the energy use of at the aircraft level for providing adequate cooling capacity for the aircraft cooling loads. In some aspects, the aircraft can include a second parallel environmental control system, which can be configured with the same as or similar components to the above-described systems, including those exemplified in FIGS. 1-5. In some aspects, such first and second parallel environmental control systems can be each configured to be operated in a first mode where the second turbine provides power to the compressor and a second mode where the second turbine is in a stand-by mode which does not provide power to the compressor. In some further aspects, the first parallel environmental control system is operated in the first mode when the second parallel environmental control system is operated in the second mode. In some further aspects, the first parallel environmental control system is operated in the second mode when the second parallel environmental control system is operated in the first mode.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An environmental air conditioning system for conditioning airflow path compressed air for supply as conditioned air, the system comprising:
   an airflow path comprising a compressor that receives the airflow path compressed air, a first heat exchanger that receives and cools air from the compressor, a first turbine that receives air from the heat exchanger and discharges said air as conditioned air;
   a second turbine that receives compressed air and discharges it as exhaust; and
   a power transfer path that transfers power output from the first turbine and power output from the second turbine to the compressor,
   wherein the system is configured to operate in a first mode in which power is transferred from the second turbine to the compressor when the first turbine does not provide sufficient power for the system to deliver conditioned air at a specified parameter, and a second mode in which power is not transferred from the first turbine to the compressor when the first turbine provides sufficient power for the system to deliver conditioned air at the specified parameter.

2. The system of claim 1, further comprising a second heat exchanger that receives and cools the airflow path compressed air, and discharges cooled airflow path compressed air to the compressor.

3. The system of claim 1, wherein the system is configured to operate the second turbine at outside ambient conditions of greater than standard day and to maintain the second turbine in a stand-by mode at other ambient conditions.

4. The system of claim 1, further comprising a fan for moving air across or through a heat absorption side of the first heat exchanger, said fan powered by the power transfer path, an electric motor, or a third turbine not connected to the power transfer path.

5. The system of claim 1, wherein the first turbine includes a variable-area nozzle.

6. The system of claim 1, wherein the first turbine includes a two position nozzle.

7. An aircraft comprising the system of claim 1, wherein the airflow path compressed air and compressed air for the second turbine are from the same source or different sources on board the aircraft, selected from an engine bleed, an auxiliary power unit bleed, or an electric powered compressor.

8. The aircraft of claim 7, further comprising a second parallel environmental control system, wherein the first and second parallel environmental control systems are each configured to be operated in a first mode where the second turbine provides power to the compressor and a second mode where the second turbine is in a stand-by mode which does not provide power to the compressor.

9. The aircraft of claim 8, wherein the first parallel environmental control system is operating in the first mode and the second parallel environmental control system is operating in the second mode.

10. A method of conditioning airflow path compressed air for supply as conditioned air, comprising:
    further compressing the compressed air in a compressor;

cooling the further compressed air from the compressor in a first heat exchanger;

expanding and cooling the air in a first turbine, and discharging the cooled air as conditioned air;

introducing compressed air from a compressed air source, which is the same as or different than the compressed air supplied to the compressor, to a second turbine and discharging air from the second turbine to an exhaust; and transferring power produced by the first and second turbines to the compressor, wherein power is transferred from the second turbine to the compressor when the first turbine does not provide sufficient power for the system to deliver conditioned air at a specified parameter, and power is not transferred from the second turbine to the compressor when the first turbine provides sufficient power for the system to deliver conditioned air at the specified parameter.

11. The method of claim 10, further comprising cooling the airflow path compressed air in a second heat exchanger and delivering the cooled airflow path compressed air to the compressor.

12. The method of claim 10, wherein the airflow path compressed air has a pressure of less than or equal to 20 psia (138 kPa).

13. The method of claim 10, wherein the second turbine is operated at outside ambient conditions of standard day and maintained in a stand-by mode at other ambient conditions.

14. The method of claim 10, wherein the first turbine includes a variable-area discharge nozzle.

15. The system of claim 1, further comprising a control valve disposed in a conduit that delivers the compressed air to the second turbine.

16. The system of claim 1, wherein the system is configured to operate in the second mode when: (i) the aircraft is on the ground because the pressure of ambient air is relatively high, (ii) at cruise altitudes under standard day atmospheric conditions, or (iii) in climb or descent modes.

17. The system of claim 16, wherein the system is configured to operate in the first mode at cruise altitudes under atmospheric conditions that deviate from standard day.

18. The system of claim 1, wherein the system is configured to operate in the second mode when ambient temperature is colder than standard day.

* * * * *